United States Patent Office 3,392,152
Patented July 9, 1968

3,392,152
PROCESS FOR THE PREPARATION OF
POLYCONDENSATION PRODUCTS
Walter Stumpf, Krefeld, and Hans-Jürgen Korth, Marl,
Germany, assignors to Chemische Werke Huls Aktiengesellschaft, Marl, Germany, a corporation of Germany
No Drawing. Filed Sept. 21, 1964, Ser. No. 406,206
Claims priority, application Germany, Oct. 12, 1963,
C 31,123
2 Claims. (Cl. 260—77.5)

It is known by the process of interfacial polycondensation to transform an organic compound which is dissolved in water and carries several active hydrogen atoms into linear or cross-linked polycondensation products by allowing it to interact with a polyvalent acid-chloride which is dissolved in a solvent that is not miscible in water. In order to permit efficient further processing of such mixtures, the concentration of the solids in the solutions should not exceed 5%.

It has been found unexpectedly that it is possible to obtain polycondensation products from at least one organic compound carrying several acid halide groups and at least one organic compound carrying several active hydrogen atoms if the reaction is carried out in water in the absence of any organic solvents.

A usable organic compound carrying several acid halide groups is 1,4-cyclohexanedimethylene-bis(chlorocarbonate) accessible from trans- and cis-1,4-cyclohexanedimethanol:

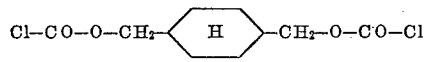

in the trans- as well as in the cis-form.

Suitable organic compounds carrying several active hydrogen atoms are members of the group consisting of hexamethylenediamine, phenylenediamine, p-aminodiphenylamine, piperazine, dimethylpiperazine, and preferably hexamethylenediamine, especially for the reaction with 1,4-cyclohexane-dimethylene-bis(chlorocarbonate).

The reaction is accomplished in a simple manner by dissolving the compound which carries the active hydrogen atoms in an aqueous base, for example a diluted potash or caustic soda lye, diluting the solution with water until the desired concentration is attained, for example .1 to .5 mol/liter, and then adding drop by drop, or in a small flow, under vigorous stirring and at temperatures ranging from moderate to medium high the multivalent acid halide, if necessary in molten form.

Normally, the polycondensation product will precipitate immediately and will change under constant stirring from a gelatinous or clotted state—usually the mass will be very sticky when in this state—gradually into a state where it loses its stickiness and can be filtered easily. The material is further processed most suitably by suction filtration, washing chloride-free with distilled water, boiling twice with distilled water, and finally sucked dry. In some instances it will be advantageous to wash with acetone or some other solvent which will not dissolve the desired product of high molecular weight but will remove the components of low molecular weight which are not soluble in water or alkali. The condensation product is dried first at 12 torr and 50° C., and then at less than 1 torr and 80° C. until constant weight is attained and the yield is then determined.

The unexpected and surprising result is that the yield is in all instances much higher than in case of the interfacial polycondensation process employing organic solvents. For example, the condensation of the cis-trans-1,4-cyclohexanedimethylene-bis(chlorocarbonate) with hexamethylenediamine, carried out in accordance with the known process in the presence of solvents such as methylenechloride and carbontetrachloride, will yield only 75% of the calculated value while the condensation carried out in accordance with the present process will yield 98%. The molecular weights, characterized by the specific viscosities (k-values), have the same values as obtained under the process carried out in the presence of solvents and are hardly influenced by the temperature. The yields however are influenced greatly by the temperature, and normally reach maximum at 70 to 85° C. Within the .1 to .5 mol/l. range the k-values are for all practical purposes not affected by the concentration. The yields likewise are almost unaffected by the concentration and only in a few cases do they show a slight increase at a higher concentration.

It was found that the reaction mixture could be stirred much more readily in the presence of detergents. If no detergents are used, the stirring usually needs to be continued for several hours in order to transform the condensation product into the non-sticky state. But the prior admixture to the aqueous solution of 4 to 8 g./l. of an ionogenic or non-ionogenic detergent, for example nonylphenylsulphonate, lauryloctaethyleneglycol, tetrapropylene-benzenesulphonic acid, triethanolamine, 10-hydroxyricinolic acid-glyceride, polyoxyethyl-ricinolic acid-glyceride (with approximately 5, 10, 20, 30 or 40 mol of ethyleneoxide), or an alkylnaphthylsulphonate to the aqueous solution will have the surprising result that the condensation products will never be sticky, not even at the time of their precipitation.

This method will not lower the yields and, surprisingly, the k-values are lowered slightly in a very few instances only if ionogenic detergents are employed. Apparently, the ions of these ionogenic detergents have no detrimental influence because k-values and yields are not affected if the concentration of the detergents is changed.

It is known, for example, to allow alcohols in an aqueous-alkaline solution to interact with acid halides. However, the various publications relating to polycondensations employ exclusively the interfacial process using two non-miscible liquids, so that the conclusion would be justified that a method where water is employed as the sole agent is not feasible. For this reason it is not only unexpected and surprising that it is possible to arrive directly at polycondensation products by the reaction in water without the need of, and by saving the expenditure of the previously required organic solvents but it is also particularly advantageous and useful that the present process results in greatly superior yields.

The polycondensation products obtained by the present process are valuable raw materials for the manufacture of foils, especially deep-drawn foils and contraction packings, fibers, "monofils," die-castings and pressed products, either alone or in admixture with other thermoplastics or with fillers, lubricants, pigments and the like.

EXAMPLE 1

11.6 g. (.1 mol) of hexamethylenediamine (HMPA) was dissolved in 110 ml. of 2 N KOH (.22 mol) and brought to 400 ml. by the addition of water. The solution was heated to 80° C. and 26.9 g. (.1 mol) of trans-cis - 1,4-cyclohexane-dimethylene-bis(chlorocarbonate), molten and heated to 50 to 60° C., was added drop by drop within one minute, the temperature being 80 to 85° C. and the speed of the stirrer being 10,000 r.p.m. The sticky polycondensation product was stirred for another five hours (at 300 r.p.m.). After this period of time it had lost its stickiness and was reduced to uniformly fine particles which however were still puffed up. The product was suction filtered, washed with distilled water until the chloride test became negative, then boiled twice with distilled water and suction filtered. After cooling the product was washed with acetone, dried first at 12 torr and 50° C., and then at less than 1 torr and 80° C. until constant of weight was attained. Yield: 30.5 g.=98% of the calculated value.

If 4 g. of nonylphenyloctaethyleneglycol is added to the preparation, no stickiness will occur and the product is finely flaky and can be processed further with ease. Yield: 95% of the calculated value.

EXAMPLE 2

10.6 g. of p-phenylene-diamine (.1 mol) (not recrystallized) were dissolved in 110 ml. of 2 N KOH and brought to 1 liter by the addition of water. The solution was heated to 70° C. and 27.0 g. of trans-cis-1,4-cyclohexane-dimethylene-bis(chlorocarbonate), molten and heated to 55 to 60° C., was added drop by drop within one minute, the temperature being 70° C. and the speed of the stirrer being 10,000 r.p.m. The product could be stirred immediately with ease. The stirring was continued for 5 minutes at 10,000 r.p.m., and for another 5 minutes at 300 r.p.m. The finely and uniformly subdivided product was suction filtered, washed with distilled water until the chloride test became negative, then boiled twice with distilled water and suction filtered. After cooling, the product was washed with 100 ml. of acetone and then dried until constant of weight was attained; first at 12 torr and 50° C. and then at less than 1 torr and 80° C. Yield: 23.0 g.=76% of the calculated value. If an emulsifier is added, the product will be very fine from the beginning.

EXAMPLE 3

The mixture was prepared and processed as set forth in Example 2 but with the exception that colorless, recrystallized p-phenylene-diamine was used, the water was boiled out in order to remove the oxygen, 5 g. of sodium hydrogen sulphite were added, and the process was carried out under a pure nitrogen atmosphere. The yield was 22.5 g. of polycondensation product=75% of the calculated value which proves that the degree of purity of the p-phenylene-diamine does not affect the yield and the product, with the impurities remaining in the solution. If an emulsifier is added, the product will be finely divided from the beginning.

EXAMPLE 4

19.4 g. of piperazine-hexahydrate (.1 mol) was dissolved in 110 ml. of 2 N KOH and brought to one liter by the addition of water. The solution was heated to 70° C. and 27.0 g. of trans-cis-1,4-cyclohexane-dimethylene-bis(chlorocarbonate), molten and heated to approximately 60° C., was added drop by drop within one minute, the temperature being 70° C. and the speed of the stirrer being 10,000 r.p.m. The product cannot be stirred easily at the beginning; in contrast to Examples 2 and 3 it will be somewhat sticky during the first minute. The stirring was continued for another 4 minutes at 10,000 r.p.m., the finely divided, puffed up material was suction filtered, washed with distilled water until the chloride test becomes negative, then boiled twice with distilled water and suction filtered. After cooling, the product was washed with 200 ml. of acetone, dried first at 12 torr and 50° C., and then at less than 1 torr and 80° C. until constant of weight was attained. Yield: 23.5 g.=83.5% of the calculated value. If initially there are added 5 g. of polyoxyethyl-ricinolic acid-glyceride (with approximately 40 mol of ethyleneoxide) as detergent, the product will precipitate immediately in very fine texture and without stickiness. The product can then be processed further with particular ease.

We claim:

1. A process for the preparation of polycondensation products which comprises reacting in substantially equimolar proportions, in a basic aqueous medium, and at a temperature within the range of from 55° C. to 85° C. (1) 1,4 - cyclohexane-dimethylene-bis(chlorocarbonate), and (2) an aqueous solution of a member selected from the group consisting of (i) hexamethylene-diamine, (ii) phenylenediamine, (iii) piperazine, (iv) dimethylpiperazine, and (v) p-amino-diphenylamine, said solution having a concentration within the range of from 0.1 to 0.5 mol/liter.

2. Process according to claim 1 in which the reaction is carried out in the presence of a detergent.

References Cited

UNITED STATES PATENTS 2,660,574  11/1950  Jones _____ 260—77.5
3,254,056  5/1966  Lovell _____ 260—77.5

DONALD E. CZAJA, Primary Examiner.

LEON J. BERCOVITZ, Examiner.

M. JACOBS, F. McKELVEY, Assistant Examiners.